United States Patent [19]
Arnblock

[11] 4,035,995
[45] July 19, 1977

[54] DEVICE FOR CONNECTING A CUTTER UNIT TO A FRAME OF A POWERED LAWNMOWER

[75] Inventor: Lennart Oswald Arnblock, Vellinge, Sweden

[73] Assignee: Flymo Societe Anonyme, Zug, Switzerland

[21] Appl. No.: 697,467

[22] Filed: June 18, 1976

Related U.S. Application Data

[63] Continuation of Ser. No. 542,611, Jan. 20, 1975, abandoned.

[30] Foreign Application Priority Data

Jan. 19, 1974 United Kingdom .................. 2637/74

[51] Int. Cl.² ............................................. A01D 35/22
[52] U.S. Cl. ............................... 56/11.6; 74/242.13 A
[58] Field of Search ................ 56/11.6, DIG. 6, 16.7, 56/11.3, DIG. 9; 74/242.8, 242.13 A, 242.12

[56] References Cited
U.S. PATENT DOCUMENTS

| | | | |
|---|---|---|---|
| 2,160,259 | 5/1939 | Cooper | 56/11.6 |
| 2,615,343 | 10/1952 | Koch | 56/DIG. 6 |
| 2,855,742 | 10/1958 | Cooper et al. | 56/11.6 |
| 2,856,786 | 10/1958 | Van Duyn | 74/242.8 |
| 3,079,743 | 3/1963 | Egley | 56/11.6 |
| 3,812,917 | 5/1974 | Strate | 56/11.6 X |

*Primary Examiner*—Russell R. Kinsey
*Attorney, Agent, or Firm*—Laurence R. Brown

[57] ABSTRACT

For detaching and attaching a lawnmower cutter unit to a frame having an engine driven pulley without requiring belt adjustment, a telescopically adjustable rod has one part secured to the frame and the other part to the cutter. This rod permits relative axial movement limited by the belt tension in one direction and in the other direction by an eccentrically mounted latching member engaging the rod parts. Limited rotational movement of the rod parts is permitted. The belt may be removed by movement of the cutter unit when the detent is unlatched. An adjustable spacing member engages the latch.

2 Claims, 2 Drawing Figures

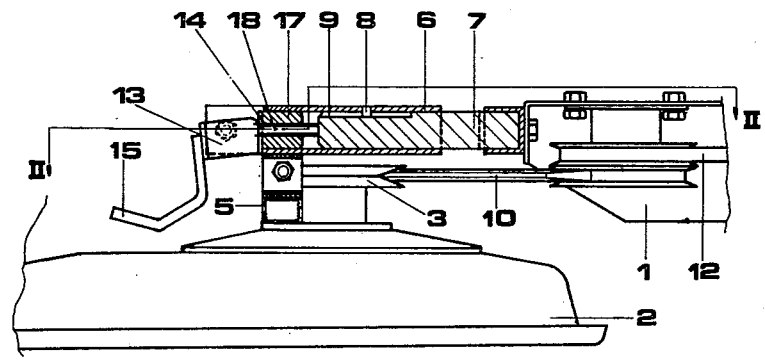
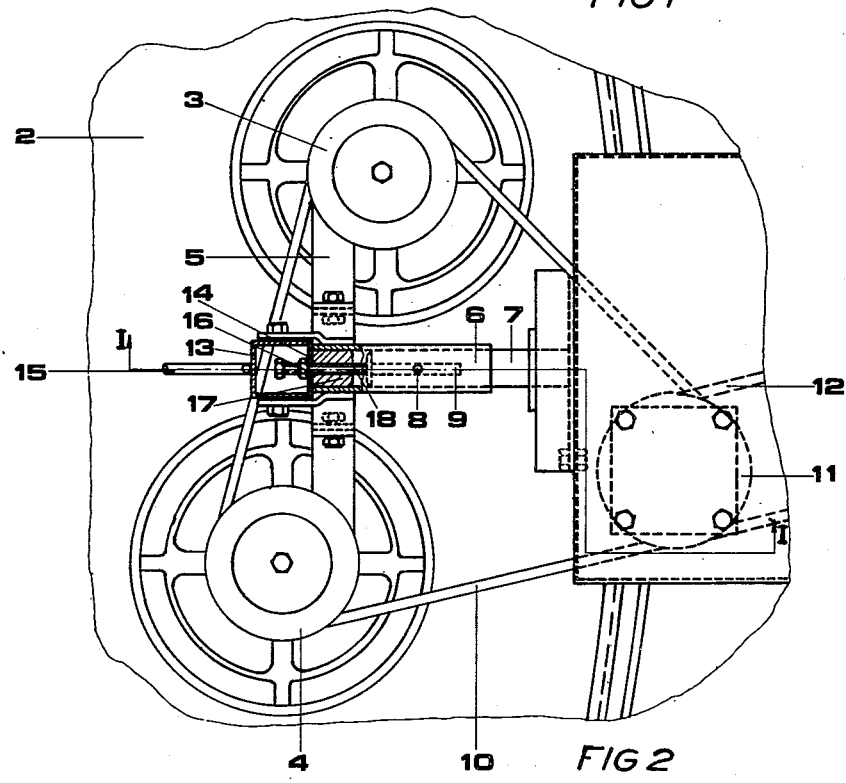
FIG 1
FIG 2

DEVICE FOR CONNECTING A CUTTER UNIT TO A FRAME OF A POWERED LAWNMOWER

This is a continuation, Ser. No. 542,611, filed Jan. 20, 1975 and now abandoned.

BACKGROUND OF THE INVENTION

This invention relates to a device of the kind (herein called "the kind defined") intended for connecting a cutter unit to a frame of a powered lawnmower, said frame supporting a power output shaft for driving a cutter or cutters in said cutter unit through a belt drive arrangement comprising at least one pulley on said cutter unit and one pulley on said power output shaft.

One object of the present invention is to provide a device of the kind defined which allows the cutter to be readily detached from the frame or attached to the frame without the necessity of adjusting the belt drive attachment.

SUMMARY OF THE INVENTION

According to the present invention there is provided a device of the kind defined comprising a telescopically adjustable rod including a first rod part and a second rod part, the first rod part being rigidly secured to the frame of the mower while the second rod part is rigidly secured to the cutter unit, the axial relative movements between said rod parts being limited in one direction by the belt transmitting force between the pulleys and in the opposite direction by a locking member secured to one of the rod parts and movable into and away from a position in which it engages the other rod part.

BRIEF DESCRIPTION OF THE DRAWING

The scope of the monopoly sought is defined in the claims hereinafter, and how the invention may be put into practice is described in more detail with reference to the accompanying drawings, in which:

FIG. 1 is a vertical section along the line I—I of FIG. 2 showing a device according to the invention, and FIG. 2 shows the device of FIG. 1 as viewed from above and partly in section along the line II—II of FIG. 1.

DESCRIPTION OF THE PREFERRED EMBODIMENT

The drawings show a part 1 of a frame of a powered lawn-mower comprising a power source (not shown) carried by said frame and means (not shown) for supporting and steering the mower while in use. The mower also comprises a cutter unit 2 shown as a housing containing two knives (not shown) each adapted to be rotated around a vertical axis, rotary driving power being transmitted to the knives through a belt drive arrangement including two pulleys 3, 4. A telescopically adjustable rod comprises a first rod part 7 and a second rod part 6. The cutter unit 2 is secured to a bracket 5 which in turn is secured to the second rod part 6 which is tubular to receive the first rod part 7, the latter being secured to the frame 1. The two rod parts 6 and 7 are telescopically displaceable relative each other. However, any substantial relative rotational movements between the two rod parts 6 and 7 are limited by a pin 8 secured to the tubular rod part 6 and protruding into a groove 9 extending longitudinally in the surface of the rod part 7. The pin 8 preferably has a diameter somewhat smaller than the width of the groove 9, thus allowing limited relative rotational movements between the two rod parts 6 and 7.

Relative axial movements of the two rod parts 6 and 7 in the direction to increase the total length of the telescopically adjustable rod are limited by a belt 10 which engages the pulleys 3 and 4 as well as a pulley 11 driven by the engine (not shown) through another drive belt 12.

Relative axial movements of the rod parts 6 and 7 in the direction to decrease the total length of the telescopically adjustable rod are limited by a locking member 13 pivotally secured to a bracket which in turn is rigidly secured to the second tubular rod part 6. The locking member 13 is in the form of an eccentrically mounted latch and is provided with a handle 15. In the illustrated locking position of the locking member 13 the latter engages a spacer 14 sandwiched between a locking nut 16 and a nut 17, both being threaded on a bolt 18. The bolt 18 in turn engages the rod part 7.

The device as described and illustrated will operate as follows.

In case it is desired to remove the cutter 2 from the frame 1, the handle 15 is moved upwardly from the position shown in FIG. 1. After being turned through 90° the locking member 13 will no longer engage the spacer 14, and it is now possible to move the cutter unit 2 towards the right through a distance sufficient to remove the belt 10 from the pulley 11. It is now possible to move the cutter unit 2 towards the left and thus move the rod part 6 completely away from the rod part 7.

Subsequent re-mounting of the cutter unit 2 is effected by simply reversing the above operations appropriately.

Adjustment of the tension of the belt 10 may be obtained by adjusting the positions of the locking nut 16 and the nut 17 on the bolt 18.

What is claimed is:

1. A quick release device for removably attaching a belt driven cutter unit to an engine driven pulley mounted on a movable frame, comprising in combination, the cutter unit having at least one drive pulley for engaging the belt, a telescopically adjustable two-part rod-cylinder array having one part rigidly secured to said frame and the second part rigidly secured to said cutter unit and relatively movable between a disengaged position with said cutter unit and frame unit separated and an engaged position with the telescopic parts mated, a belt about said pulley retaining said rod and cylinder in telescoping arrangement and limiting relative axial movement of the two parts in the direction of increase of length of the telescopic parts, and locking means comprising two manually operable locking members respectively on said rod parts movable into engagement with each other for locking the parts in telescopic registration preventing axial movement of said rod parts in the direction loosening the belt about said pulleys said locking means being provided with an adjustable spacer for engaging said rod and an eccentrically mounted latch member presenting a surface engaging said spacer to restrict movement of said rod in locked position toward loosening said belt and permitting telescoping in unlocked position in the direction loosening said belt to thereby permit removal of said belt from said pulley and telescopic disengagement of said cutter from said frame.

2. A device as defined in claim 1 wherein one of said rod parts is provided with a pin and the other with an axially extending groove into which said pin protrudes, with the width of the groove slightly exceeding the diameter of said pin, thereby permitting a limited degree of rotational movement of said rod parts.

* * * * *